Jan. 7, 1964  F. BACHMANN  3,117,033
SEALED ALKALINE STORAGE BATTERY WITH HYDROGEN
ABSORBING ELECTRODE
Filed Aug. 18, 1960  2 Sheets-Sheet 1
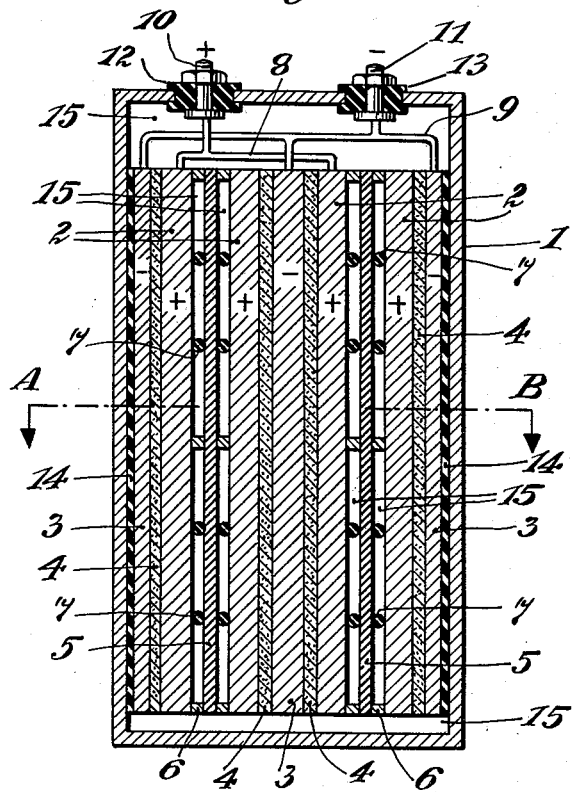
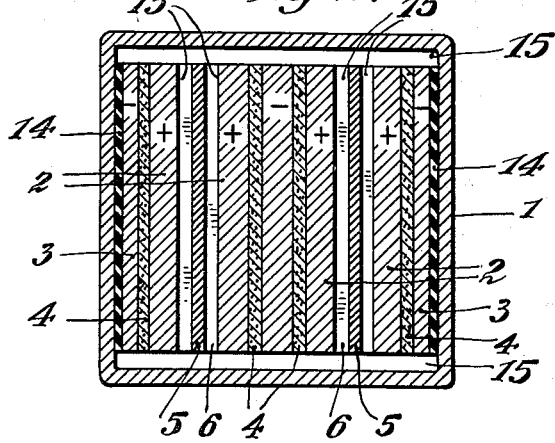
INVENTOR
Fritz Bachmann
BY Michael S. Striker
his ATTORNEY Jan. 7, 1964   F. BACHMANN   3,117,033
SEALED ALKALINE STORAGE BATTERY WITH HYDROGEN
ABSORBING ELECTRODE
Filed Aug. 18, 1960   2 Sheets-Sheet 2
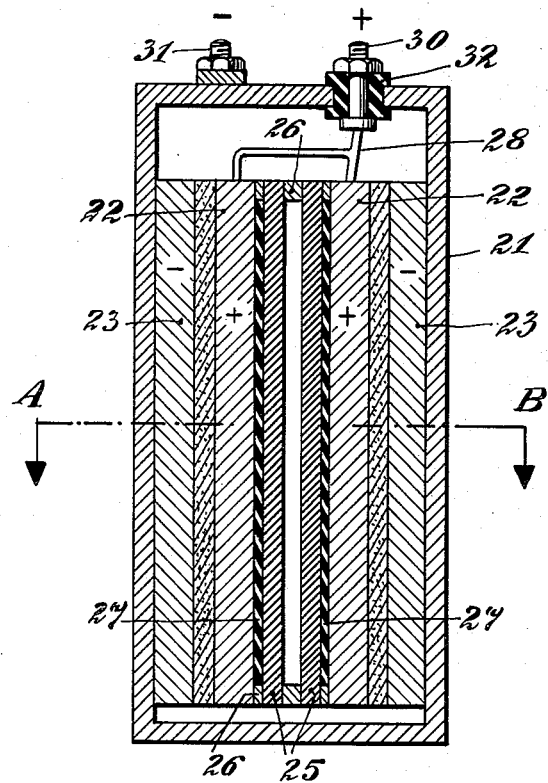
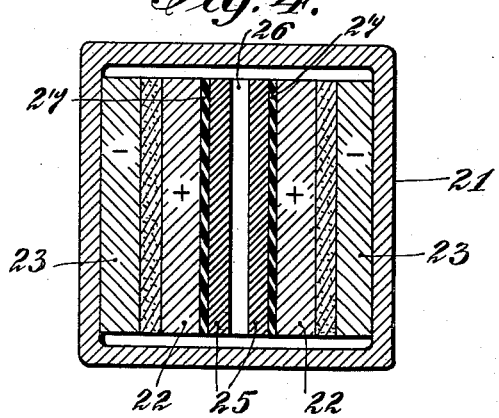
INVENTOR
Fritz Bachmann
BY Michael S. Striker
his ATTORNEY United States Patent Office 3,117,033
Patented Jan. 7, 1964

3,117,033
SEALED ALKALINE STORAGE BATTERY WITH HYDROGEN ABSORBING ELECTRODE
Fritz Bachmann, Hagen, Westphalia, Germany, assignor to Varta Aktiengesellschaft
Filed Aug. 18, 1960, Ser. No. 50,493
Claims priority, application Germany Jan. 8, 1953
8 Claims. (Cl. 136—6)

The present invention relates to a hydrogen-absorbing electrode arrangement, particularly for alkaline storage batteries, which is a further development of the one described in my application Serial No. 330,977, now abandoned, of July 25, 1952.

The present application is a continuation-in-part of my co-pending application Serial Number 400,350, now abandoned, filed December 24, 1953, and entitled: "Hydrogen Absorbing Electrode."

In the first mentioned application, an accumulator with a neutral or alkaline electrolyte is described, comprising a positive and a negative electrode, and an additional or auxiliary electrode, which contains silver or a silver compound, in electrical connection with the positive electrode. An electrode of this kind is capable of absorbing hydrogen and it is, therefore, possible to provide such accumulators with gas-tight enclosures.

However, it is necessary that the hydrogen absorption occurs as rapidly as possible in order to insure a satisfactory operation of the accumulator.

A certain disadvantage in the use of silver or silver oxide in connection with the positive electrode is due to the fact that silver oxide is slightly soluble in caustic potash solution and can therefore migrate to the negative electrode, though this will occur in minimal amounts only. This, however, is undesirable since the silver deposited on the surface of the negative electrode may cause short-circuiting in the cell.

It is an object of the present invention to overcome the above mentioned inconvenience.

With the above and other objects in view, the present invention contemplates in a hermetically sealed alkaline storage battery, in combination, positive and negative electrodes, an absorbent separator between the positive and negative electrodes, an alkaline electrolyte substantially absorbed by the electrodes and separator, and a gas-consuming auxiliary electrode including a substance selected from the group consisting of silver and silver compounds connected electrically with the positive electrode and located at the side of the positive electrode which faces away from the negative electrode.

According to the present invention specially provided additional electrodes may be filled with silver and/or silver compounds and placed at that side of the positive electrode of a gas-tight enclosed accumulator, i.e., a hermetically sealed, alkaline storage battery at which it does not face the negative electrode, i.e., the auxiliary electrode is located at that side of the positive electrode which faces away from the negative electrode. In double-plate arrangement, the additional electrodes may be placed between two positive electrodes and/or between the positive electrode and the container wall. For instance, a positive electrode arrangement may be provided which consists of two positive electrode plates and a gas-consuming auxiliary electrode interposed between and electrically connected with the positive electrode plates.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal section through an alkaline storage battery including the additional or auxiliary electrode according to the present invention;

FIG. 2 is a transverse section drawn along the line A—B of FIG. 1;

FIG. 3 is another embodiment of the storage battery shown in longitudinal section; and FIG. 4 is a transverse section along line A—B of FIG. 3.

Referring now to the drawing, and particularly to FIGS. 1 and 2, an accumulator or battery casing 1 is shown, which can be hermetically closed so as to be gas- and liquid-tight. The casing encloses the electrochemically active masses. Several positive electrodes are designated by 2 and negative electrodes by 3. These electrodes contain the known active masses and are designed according to known principles. Separators 4 are arranged between the positive and the negative electrodes, said separators being made of absorptive material. In the embodiment shown in FIGS. 1 and 2, the positive electrodes 2 are built as double electrodes which have arranged between them additional electrodes 5 connected to the positive electrodes by contact bridges 6. The additional electrodes 5 consist, according to the invention, of silver, or they contain silver or silver compounds. If desired, spacing elements 7 of absorptive non-conductive material may be provided between the electrodes 2 and the additional electrodes 5.

Wires 8 and 9 connect the positive and negative electrodes with the positive pole 10 and the negative pole 11, respectively; these poles are received in insulated inserts 12 and 13 which are mounted in the casing in gas-tight manner as are also the poles in said inserts.

The plate assembly is insulated from the casing 1 by a plastic foil 14. The electrolyte is immobilized and the positive additional electrodes 5 are therefore exposed to and surrounded by gas-space 15. They are consequently capable of consuming with sufficient velocity the hydrogen evolved during charging. The negative electrodes are capable of absorbing at the same time the oxygen evolved.

In FIGS. 3 and 4, a further embodiment of an accumulator comprising additional electrodes is shown. In this embodiment a casing 21 is provided enclosing a double electrode 22, with two additional electrodes 25 arranged between the two halves of double electrode 22. The negative electrodes are designated by 23. A connection is provided between the additional electrodes 25 and the two halves of the positive electrode 22 by metallic contact bridges 26 and by electrolyte-containing absorptive non-conducting separator material 27. In this example, the negative electrodes are in direct contact with casing 21 and thereby with negative pole 31. The connection of the positive electrode 22 with the positive pole 30 is made by a connecting wire 28. The positive pole is mounted in an insert 32. The operation is the same as described with reference to FIGS. 1 and 2.

The additional electrodes according to the present invention consist for instance of a filled, if desired, of grooved or cup-shaped support such as pockets, or tubes of perforated sheet metal or of a sintered metal frame, with a filling therein which contains silver or a silver compound; they may be sintered electrodes, F. 1, plates of sintered silver powder, or porous pressed bodies of silver and/or a silver compound with or without an addition of a metallic conductive powder, such as nickel or graphite.

The effect of the additional electrodes is increased, according to the invention, by the use of inserts made of narrow strips of porous, lye-absorbing, alkali-resistant material, e.g. strings, threads, or bands of alkali-resistant fabric, which are placed between the additional and the main electrodes. A metallic connection has to be provided between the additional and the positive electrode. This can be done in a conventional manner by making the additional electrode, the positive electrode and/or the container wall with grooves or corrugations, and by interposing between the porous alkali-resistant material inserts of alkali-resistant metallic materials, such as nickel, graphite and the like.

Thus, before being placed in the accumulator, the additional electrodes may for instance be provided with windings of spun porous threads of polyvinyl chloride and at the same time with nickelplated iron wire with spaced windings.

An additional electrode as described operates as follows:

The connections formed by the alkali solution and the metallic connections between the additional and positive electrodes make it possible for the silver in the additional electrode to be converted into hydrogen-absorbing silver oxide. Silver oxide, traces of which are dissolved in the alkali solution, are only capable of reaching the positive electrode in minute amounts by way of the narrow bridging connections of the lye, and reach the negative electrodes in hardly traceable, harmless quantities and thus migration of silver oxide from the gas-consuming auxiliary electrode to the negative electrode and consequent deposition of silver at the negative electrode is impeded.

The spaces between the windings or the grooves in the additional and the positive electrodes serve for increasing the absorptive surfaces and, thereby, for accelerating the hydrogen absorption.

In all these considerations it is assumed that generally in gas-tight enclosed accumulators is remaining only as much electrolyte as is necessary for the working of the accumulator. Generally that is the quantity of electrolyte absorbed by the electrodes and the material of the separators, i.e., the absorbent separator between electrodes of opposite polarity. However, there are special cases in which the top of the electrodes and/or separators is more or less emerging above the level of the electrolyte.

It will be understood that each of the elements described above, or two or more together, may also find a useful application in other types of batteries, differing from the types described above.

While I have illustrated and described the invention as embodied in a hermetically sealed alkaline storage battery, I do not intend to be limited to the details shown, since various modifications and structural changes may be made without departing in any way from the spirit of my invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a hermetically sealed alkaline storage battery, in combination, positive and negative electrodes, the capacities of said electrodes of opposite polarity being such that at least at some time during operation of said battery hydrogen gas is formed at said negative electrode; an absorbent separator between said positive and negative electrodes; an alkaline electrolyte substantially absorbed by said electrodes and separator; and a gas-consuming auxiliary electrode including a substance selected from the group consisting of silver and silver compounds connected electrically with said positive electrode and located at the side of said positive electrode which faces away from said negative electrode, whereby any silver originating from said auxiliary electrode and dissolved in said alkaline electrolyte will be substantially prevented from migrating to said negative electrode due to interposition of said positive electrode between said auxiliary electrode and said negative electrode.

2. In a hermetically sealed alkaline storage battery, in combination, positive and negative electrodes, the capacities of said electrodes of opposite polarity being such that at least at some time during operation of said battery hydrogen gas is formed at said negative electrode; an absorbent separator between said positive and negative electrodes; an alkaline electrolyte substantially absorbed by said electrodes and separator; and a gas-consuming auxiliary electrode consisting at least in part of silver oxide connected electrically with said positive electrode and located at the side of said positive electrode which faces away from said negative electrode, whereby migration of silver oxide from said gas-consuming auxiliary electrode to the negative electrode and consequent deposition of silver at said negative electrode is impeded by the interposition of said positive electrode between said auxiliary and said negative electrode.

3. In a hermetically sealed alkaline storage battery, in combination, positive and negative electrodes, the capacities of said electrodes of opposite polarity being such that at least at some time during operation of said battery hydrogen gas is formed at said negative electrode; an absorbent separator between said positive and negative electrodes; an alkaline electrolyte substantially absorbed by said electrodes and separator; and a gas-consuming auxiliary electrode consisting essentially of a plate of sintered silver powder connected electrically with said positive electrode and located at the side of said positive electrode which faces away from said negative electrode, whereby migration of silver oxide from said gas-consuming auxiliary electrode to the negative electrode and consequent deposition of silver at said negative electrode is impeded by the interposition of said positive electrode between said auxiliary and said negative electrode.

4. In a hermetically sealed alkaline storage battery, in combination, a positive electrode arrangement consisting essentially of two positive electrode plates and a gas-consuming auxiliary electrode including a substance selected from the group consisting of silver and silver compounds, interposed between and connected electrically with said positive electrode plates; a negative electrode spaced from said positive electrode arrangement, the capacities of said electrodes of opposite polarity being such that at least at some time during operation of said battery hydrogen gas is formed at said negative electrode; an absorbent separator located between and contacting said negative electrode and a positive electrode of said positive electrode arrangement; and an alkaline electrolyte substantially absorbed by said electrodes and separator, whereby migration of silver oxide from said gas-consuming auxiliary electrode to said negative electrode and consequent deposition of silver at said negative electrode is impeded by the interposition of said positive electrode plates between said auxiliary and negative electrodes.

5. In a hermetically sealed alkaline storage battery as defined in claim 1, an alkali-resistant, lye-absorbing, porous material located between and contacting said gas-consuming auxiliary electrode and said positive electrode.

6. In a hermetically sealed alkaline storage battery, in combination, positive and negative electrodes, the capacities of said electrodes of opposite polarity being such that at least at some time during operation of said battery hydrogen gas is formed at said negative electrode; an absorbent separator between said positive and negative electrodes; an alkaline electrolyte substantially absorbed by said electrodes and separator; and a gas-consuming auxiliary electrode comprising a support filled with a substance selected from the group consisting of silver and silver compounds, connected electrically with said positive electrode and located at the side of said positive electrode which faces away from said negative electrode whereby migration of silver originating from said auxiliary electrode and dissolved in said alkaline electrolyte to said negative electrode will be impeded by the interposition of said positive electrode between said negative and auxiliary electrodes.

7. In a hermetically sealed alkaline storage battery, in combination, positive and negative electrodes, the capacities of said electrodes of opposite polarity being such that at least at some time during operation of said battery hydrogen gas is formed at said negative electrode; an absorbent separator between said positive and negative electrodes; an alkaline electrolyte substantially absorbed by said electrodes and separator; and a gas-consuming auxiliary electrode comprising a perforated pocket serving as support and filled with a substance selected from the group consisting of silver and silver compounds, connected electrically with said positive electrode and located at the side of said positive electrode which faces away from said negative electrode, whereby migration of silver originating from said auxiliary electrode and dissolved in said alkaline electrolyte to said negative electrode will be impeded by the interposition of said positive electrode between said negative and auxiliary electrodes.

8. In a hermetically sealed alkaline storage battery, in combination, positive and negative electrodes, the capacities of said electrodes of opposite polarity being such that at least at some time during operation of said battery hydrogen gas is formed at said negative electrode; an absorbent separator between said positive and negative electrodes; an alkaline electrolyte substantially absorbed by said electrodes and separator; and a gas-consuming auxiliary electrode comprising a perforated tube serving as support and filled with a substance selected from the group consisting of silver and silver compounds, connected electrically with said positive electrode and located at the side of said positive electrode which faces away from said negative electrode, whereby migration of silver originating from said auxiliary electrode and dissolved in said alkaline electrolyte to said negative electrode will be impeded by the interposition of said positive electrode between said negative and auxiliary electrodes.

References Cited in the file of this patent

UNITED STATES PATENTS

| | | |
|---|---|---|
| 897,833 | Hubell | Sept. 1, 1908 |
| 1,955,115 | Drumm | Apr. 17, 1934 |
| 2,614,138 | Jacquier | Oct. 14, 1952 |
| 2,798,110 | Peters | July 2, 1957 |
| 2,842,607 | Germershausen et al. | July 8, 1958 |
| 2,934,580 | Neumann | Apr. 26, 1960 |
| 2,934,581 | Dassler | Apr. 26, 1960 |